UNITED STATES PATENT OFFICE.

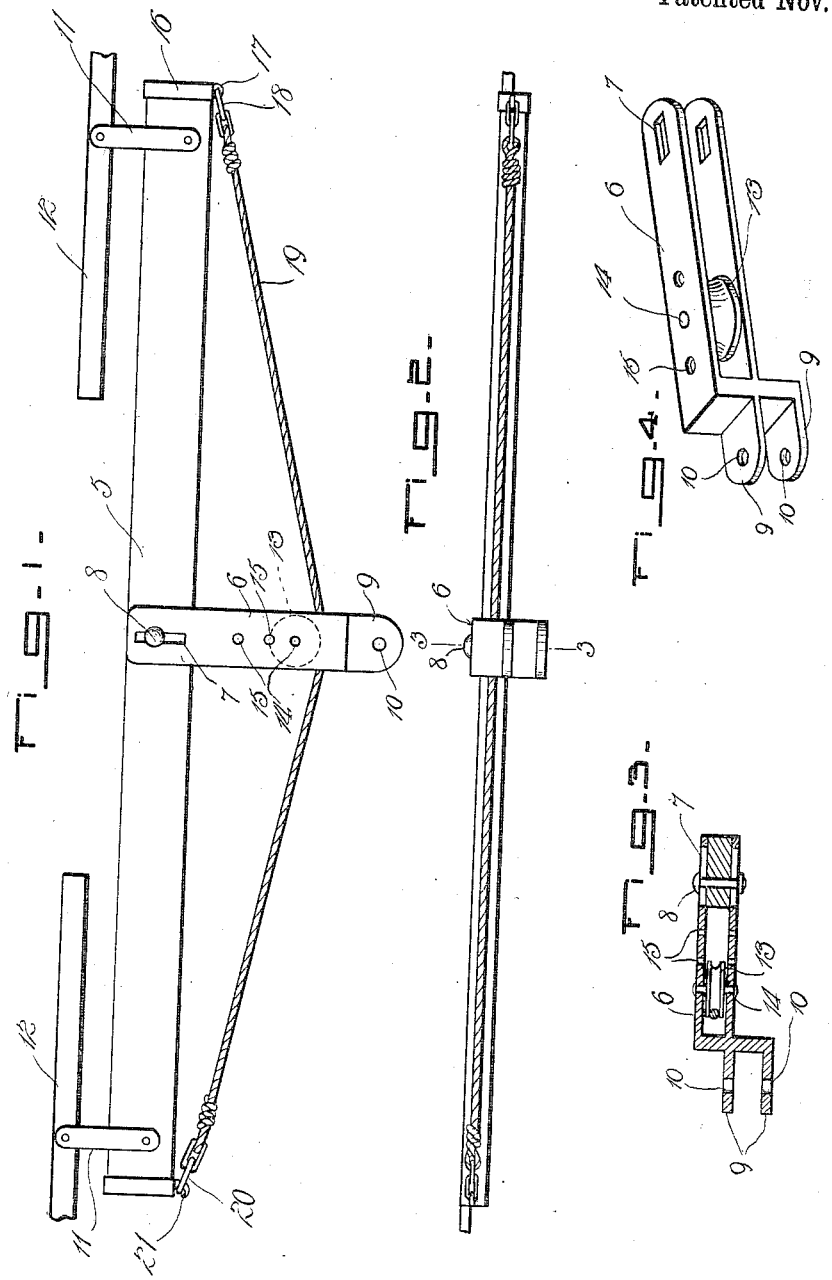

IRNEY D. RYAN, OF DEVILS LAKE, NORTH DAKOTA.

DRAFT-EQUALIZER.

1,044,577.

Specification of Letters Patent.   Patented Nov. 19, 1912.

Application filed September 28, 1909.   Serial No. 519,940.

*To all whom it may concern:*

Be it known that I, IRNEY D. RYAN, a citizen of the United States, residing at Devils Lake, in the county of Ramsey, State of North Dakota, have invented certain new and useful Improvements in Draft-Equalizers; and I do hereby declare the following to be a full, clear, and exact description of the invention, such as will enable others skilled in the art to which it appertains to make and use the same.

The invention relates to a draft equalizer and more particularly to the class of equalizers for use on plows, cultivators or vehicles.

The primary object of the invention is the provision of a draft equalizer in which the strain upon the evener bar or beam is relieved through the medium of a flexible chain or cable attached to said evener bar or beam and working over a pulley mounted in the rear thereof.

Another object of the invention is the provision of a draft equalizer in which the evener beam is so mounted to permit slight displacement longitudinally of its supporting bracket so as to relieve sudden shocks thereto and to overcome full strain or in other words minimize the stress upon the same when in operation by means of a flexible element connected thereto at opposite ends and working over a pulley adjustably mounted in the bracket supporting equalizer.

A further object of the invention is the provision of a draft equalizer which is simple in construction, thoroughly reliable and efficient in operation and inexpensive in the manufacture.

With these and other objects in view, the invention consists in the construction, combination and arrangement of parts as will be hereinafter more fully described in detail, illustrated in the accompanying drawings which disclose the preferred form and embodiment of the invention, and as set forth in the claim hereunto appended.

In the drawings:—Figure 1 is a top plan view of a draft equalizer constructed in accordance with the invention. Fig. 2 is a rear elevation thereof. Fig. 3 is a sectional view on the line 3—3 of Fig. 2. Fig. 4 is a detail perspective view of the bracket and guide pulley supported thereby.

Similar reference characters indicate corresponding parts throughout the several views in the drawings.

In the drawings the numeral 5 designates an evener bar which may be constructed of any suitable material and of any desirable length although it is preferably of rectangular shape in cross section and this evener bar is supported in a bracket comprising a single piece of metal formed with horizontally disposed spaced parallel guide ears or extensions 6 the latter containing near their outer end registering elongated guide slots 7, the same being engaged by a connecting pin 8 mounted centrally in the evener bar so that the latter may have slight movement longitudinally with respect to the guide ears 6 of the bracket. This bracket is formed with oppositely directed spaced parallel attaching ears 9 the same containing registering apertures 10 to permit the bracket to be detachably connected to the frame of a cultivating implement or to a vehicle in the ordinary well known manner.

Connected near opposite ends of the evener bar by means of pivotal clevises 11 are the usual double-trees 12 to which latter are adapted to be attached draft animals.

Mounted between the guide ears 6 of the bracket a considerable distance in rear of the evener bar 5 is a grooved pulley 13 the latter connected to said ears by means of a pin 14 the same engaging a pair of a series of spaced registering openings 15 contained in the ears 6 and by these openings 15 the said pulley may be adjusted toward and away from the evener bar 5 when the occasion may demand.

Mounted at opposite ends of the evener bar 5 are collars 16, one of which is formed with an eye 17 supporting a ring 18 to which is connected one end of a flexible cable 19 the latter trained over the pulley 13 and having its opposite end detachably connected by means of a ring 20 to a hook 21 formed on the remaining collar 16 carried by the evener bar.

It is obvious that by the particular mounting of the evener bar 5 in the supporting bracket that the ordinary or usual strain will be relieved from said evener bar for the reason that said strain will exist and be taken up by the flexible cable 19 connected to said evener bar. It is of course to be understood that should the cable 19 become stretched the same may be shortened at the will of the operator.

It will be observed from an inspection of the drawings that the arrangement of the ears 6 and 9 causes the latter to bindingly engage the other attaching member when pull is exerted upon the ears 6.

From the foregoing, the construction and operation of the invention will be clearly apparent without the necessity of a more extended explanation, therefore the same has been omitted.

What is claimed is:—

The combination with an evener bar having draft members connected thereto adjacent to the ends, of a bracket connected to the central portion of the bar, said bracket being formed of a single piece of metal and comprising a vertical base member, rearwardly extending ears formed at the lower end and central portion of said base and extending laterally therefrom in spaced parallel relation, relatively long forwardly extending ears projecting laterally from the central and top portions of the base plate on the opposite side from the rearwardly extending ears and having longitudinally disposed slots in the terminals for engagement with a draft element, a pulley carried between the forward ears adjacent to the base plate and a cable connected to the ends of the draft bar at its terminal and reeved through the pulley.

In testimony whereof, I affix my signature, in presence of two witnesses.

IRNEY D. RYAN.

Witnesses:
C. M. FISHER,
JOSEPH RYAN.

---

Copies of this patent may be obtained for five cents each, by addressing the "Commissioner of Patents, Washington, D. C."